US006783164B2

(12) United States Patent
Bortell (10) Patent No.: US 6,783,164 B2
(45) Date of Patent: Aug. 31, 2004

(54) TRANSPORTABLE SATELLITE COMMUNICATION STATION INCLUDING DOUBLE-EXPANDABLE TRAILER

(75) Inventor: J. Thomas Bortell, Adrian, MI (US)

(73) Assignee: Veridian ERIM International, Inc., Ann Arbor, MI (US)

( * ) Notice: Subject to any disclaimer, the term of this patent is extended or adjusted under 35 U.S.C. 154(b) by 266 days.

(21) Appl. No.: 10/187,530

(22) Filed: Jul. 2, 2002

(65) Prior Publication Data

US 2004/0094983 A1 May 20, 2004

Related U.S. Application Data

(62) Division of application No. 09/566,515, filed on May 8, 2000, now Pat. No. 6,422,628.
(60) Provisional application No. 60/133,281, filed on May 10, 1999.

(51) Int. Cl.[7] .................................................. B60P 3/35
(52) U.S. Cl. ............................... 296/24.33; 296/24.39; 296/26.13; 455/517
(58) Field of Search ........................... 296/24.3, 24.32, 296/24.33, 24.34, 24.36, 24.38, 24.39, 26.13, 26.14, 26.15; 455/517

(56) References Cited

U.S. PATENT DOCUMENTS

| | | | |
|---|---|---|---|
| 3,644,883 A | 2/1972 | Borman et al. ............... 340/23 |
| 4,133,571 A | 1/1979 | Fillios .......................... 296/23 |
| 4,759,582 A | 7/1988 | Kutzner ....................... 296/170 |
| 4,955,661 A | 9/1990 | Mattice ....................... 296/171 |
| 4,979,170 A | 12/1990 | Gilhousen et al. ........ 370/104.1 |
| 5,248,180 A | 9/1993 | Hussaini ..................... 296/171 |
| 5,291,701 A | 3/1994 | Delacollette et al. .......... 52/67 |
| 5,398,986 A | 3/1995 | Koob ........................ 296/24.1 |
| 5,560,667 A | 10/1996 | Edry ........................... 296/26 |
| 5,682,139 A | 10/1997 | Pradeep et al. ............. 340/539 |
| 5,706,616 A | 1/1998 | Fernandez ................... 52/143 |
| 5,833,294 A | 11/1998 | Williams et al. ........... 296/24.1 |
| 5,842,132 A | 11/1998 | Fukutomi ................... 455/456 |
| 6,003,919 A | 12/1999 | Shook ..................... 296/26.14 |
| 6,135,525 A | 10/2000 | Amann ................ 296/26.12 X |
| 6,209,939 B1 | 4/2001 | Wacker ............... 296/26.13 X |

*Primary Examiner*—Joseph D. Pape
(74) *Attorney, Agent, or Firm*—Gifford, Krass, Groh, Sprinkle, Anderson & Citkowski, PC (57) ABSTRACT

An expandable trailer is designed for transportation and use of satellite communication related electronic equipment. The trailer has a generally horizontal support frame with an upper surface defining a floor of the trailer. A pair of spaced apart generally vertical side walls extend upwardly from the support frame and define an interior transport area between the walls. An expansion module is supported in an opening in one of the side walls. The expansion module has a vertical front panel and rear panel with inboard edges and outboard edges. The panels are spaced apart to define the front and rear of the expansion module. A generally vertical side panel extends between the outboard edges of the front and rear panels and has an upper edge and a lower edge.

3 Claims, 8 Drawing Sheets

TRANSPORTABLE SATELLITE COMMUNICATION STATION INCLUDING DOUBLE-EXPANDABLE TRAILER

REFERENCE TO RELATED APPLICATION

This application is a Divisional of prior application No. 09/566,515, filed May 8, 2000, now U.S. Pat. No. 6,422,628, which claims priority of U.S. provisional application Ser. No. 60/133,281, filed May 10, 1999, the entire contents of which are incorporated herein by reference.

FIELD OF THE INVENTION

The present invention relates generally to expandable trailers and satellite communication stations and, more specifically, to an expandable trailer having movable floor and roof panels such that the use of floor space in the trailer is improved.

BACKGROUND OF THE INVENTION

It is often necessary to transport sophisticated equipment to various parts of the world for temporary use. An example of equipment to be transported is satellite communication equipment. In many places, permanent structures have been built which house sophisticated satellite communication-related equipment. The accompanying satellite antenna is mounted on or near the structure. Such a satellite communication station is highly useful for military and civilization communication purposes. However, there are many parts of the world that lack modern satellite communication stations. Also, due to various situations such as natural disasters, permanent satellite communication stations may become temporarily unusable. In both of these cases, there is a need for a satellite communication station which may be easily transported to a given location and quickly set up for use. Currently, no such system is available.

Expandable trailers have long been used to partially overcome the size limitations placed on highway-transportable vehicles. Trucks and trailers to be transported over public roads are limited in how wide and long they may be. However, it is often desirable to have more space inside the truck or trailer once the truck or trailer reaches its destination. For example, travel trailers are popular for vacation travel. However, as with other types of trailers, travel trailers are limited in width. Once a vacationing family reaches their destination, they may wish to have more space inside the trailer. To address this need, expandable trailers have been developed wherein an opening in a side of the trailer supports an expansion module which moves outwardly once the trailer reaches its destination, thereby giving increased interior space. Expandable trailers have also been used for other applications such as mobile offices, mobile surgical units, and mobile theaters. In each case, expansion modules of the trailers extend outwardly from the sides of the trailer to give increased interior space once the trailer reaches its destination. A challenge faced in the design of expandable trailers is how to nest the expansion module with the central portion of the trailer in a space-sufficient manner. In most cases, the expansion module includes an outer wall panel, two end wall panels, and a roof panel and floor panel, with each of these panels remaining in a fixed configuration with respect to the others. When the expansion module is moved inwardly to a closed, or transport, position, the fixed roof, floor, and end panels intrude into the interior space of the central portion of the trailer. That is, the roof panel typically rests below the existing roof of the central portion, and the floor panel rests above the existing floor of the central portion. Therefore, items to be transported in the trailer may not occupy the space where the two sections of floor and roof overlap. This is likewise true with the end panels. While this may not present problems in a travel trailer environment, some applications are not well-suited to this arrangement.

One approach to partially overcoming this problem is to have the roof and floor panels nest into pockets in the floor and ceiling of the central portion of the trailer. In this way, the roof and floor of the central portion of the trailer remain useable when the expansion module is closed. An example of this approach is shown in U.S. Pat. No. 4,955,661 to Mattice. The Mattice patent shows an expandable trailer designed for surgical applications. The floor of the central portion of the trailer is somewhat raised and the ceiling is somewhat lowered so as to define spaces wherein the roof and floor panels of the expandable portion may reside when the expansion module is closed. A significant drawback to this approach is that the overall usable height in the central portion of the trailer is significantly reduced by raising the floor and lowering the ceiling. This is unacceptable for some applications. In light of this, there remains a need for an expandable trailer wherein the roof panel and floor panel of the expansion portion of the trailer do not interfere with the useable height in the central portion of the trailer.

SUMMARY OF THE INVENTION

The present invention overcomes many of the shortcomings of the prior art by providing an expandable trailer for transport and use of satellite-communication related equipment. The trailer includes a generally horizontal support frame with a front end designed to interconnect with a towing vehicle and a rear end. The support frame includes ground-engaging wheels for transport purposes and has an upper surface which defines the floor of the trailer. A pair of spaced apart generally vertical side walls extends upwardly from the support frame and define an interior transport area therebetween. At least one of the side walls has an opening defined therein. An expansion module is supported in the opening. The expansion module includes a front panel and a rear panel that are generally vertical and have an inboard edge and an outboard edge. The panels are spaced apart so as to define the front and rear of the expansion module. A generally vertical side panel extends between the outboard edges of the front and rear panels and has an upper edge and a lower edge. The expansion module has a closed position, wherein the side panel is generally aligned with the side wall and the outboard edges of the front and rear panels are adjacent to the side wall. The expansion module also has an expanded position, wherein the side panel is spaced from the side wall and the inboard edges of the front and rear panels are adjacent the side wall. Some embodiments include a movable floor panel that has a storage position wherein the floor panel is generally parallel to the side panel. The floor panel is placed in the storage position when the expansion module is in the closed position. The floor panel also has a use position, wherein the floor panel is generally perpendicular to the side panel. The floor panel is placed in this position when the expansion module is in the expanded position so that the floor panel extends between the floor of the trailer and the lower edge of the side panel. Some embodiments include a movable roof panel that has one edge hingedly connected to the side wall above the opening. The movable roof panel extends downwardly adjacent the side panel when the expansion module is in the closed position. The roof panel is pivoted upwardly when the expansion module is moved to the expanded position such that the roof panel extends outwardly from the side wall and rests atop the upper edge of the side panel.

DETAILED DESCRIPTION OF THE INVENTION

Figure 1:
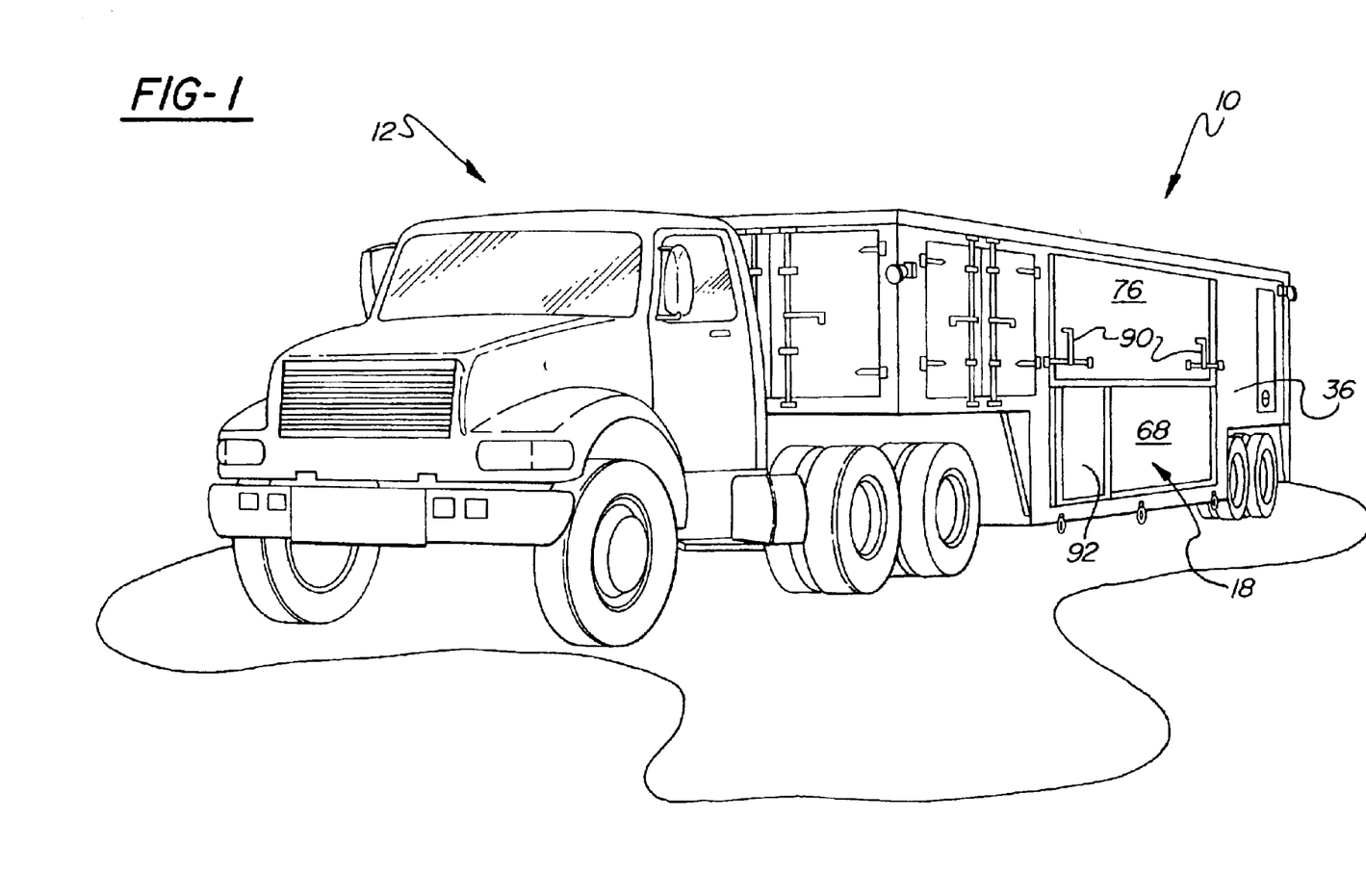
FIG. 1 is a perspective view of an expandable trailer according to the present invention in its transport configuration, interconnected with a tow vehicle.
Figure 2:
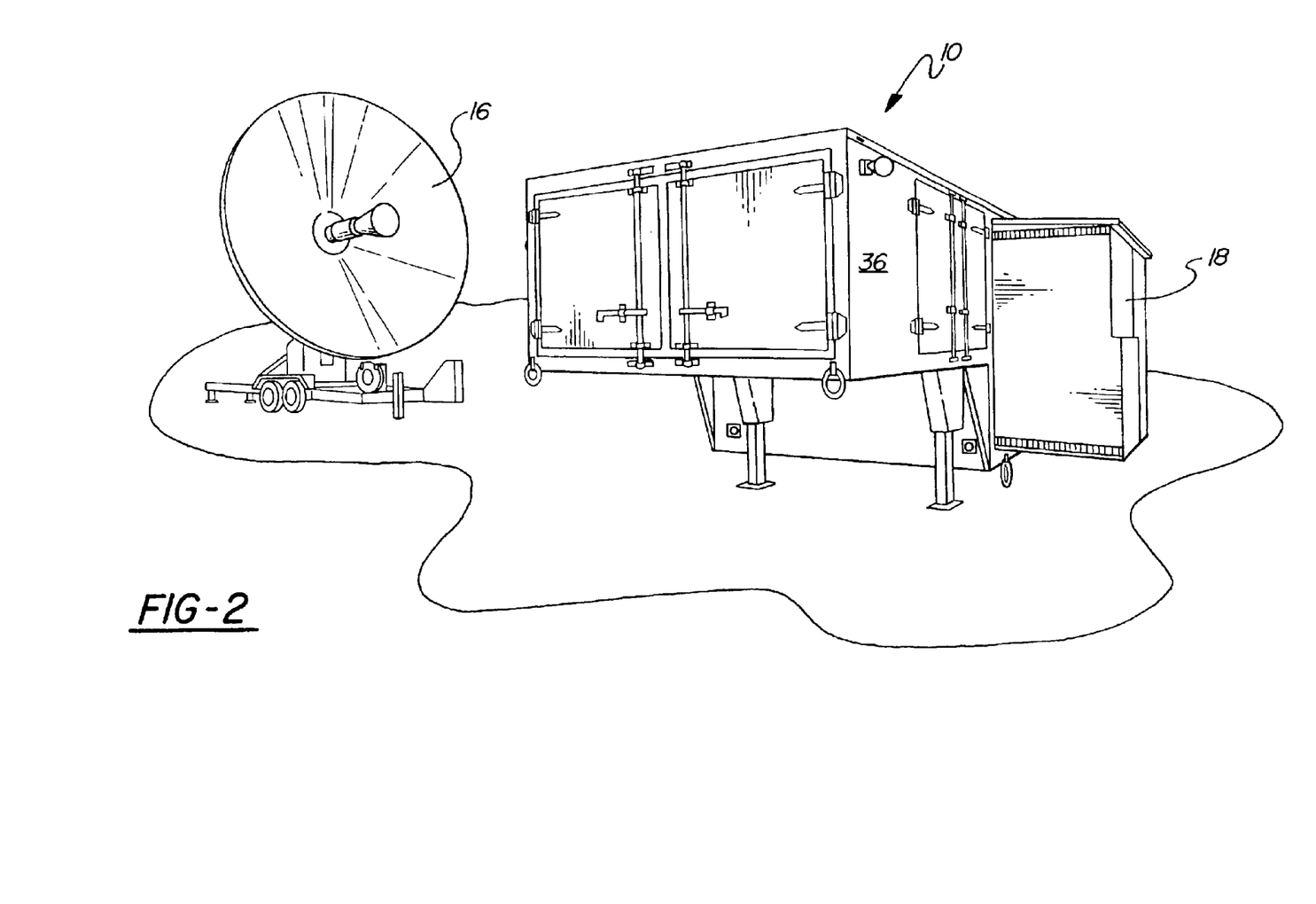
FIG. 2 is a perspective view of an expandable trailer according to the present invention set up in its use configuration with an expansion module extending from the side of the trailer 10, and a satellite antenna set up adjacent the trailer.
Figure 7:
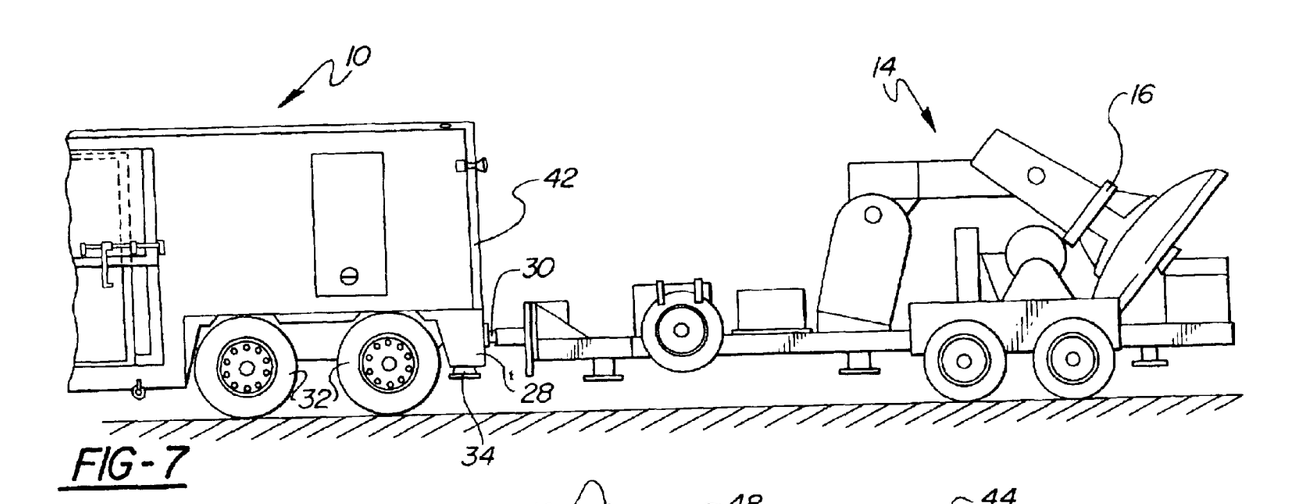
FIG. 7 is a side elevational view of a back portion of a trailer according to the present invention interconnected with a sub-trailer for transporting a satellite antenna.

Referring to FIG. 1, an expandable trailer according to the present invention is generally shown at 10. The trailer 10 is a double-drop trailer designed to be towed by a semi-tractor 12 so that the trailer 10 may be transported to locations where it is needed. As shown in FIG. 7, the trailer 10 is designed to tow a sub-trailer 14, which includes a folding satellite communication dish 16. FIG. 2 shows the expandable trailer 10 detached from the tractor and set up for use with an expansion module 18 in the side of the trailer extended outwardly into an expanded position so as to provide work space inside the trailer 10. The satellite dish 16 is set up next to the trailer for communication purposes. Because the trailer 10 is designed to be transported to various locations, it is designed to fit, along with the tow vehicle, into the cargo hold of a transport aircraft, such as a C-130 or C-141. This necessitates the trailer being smaller than trailers typically towed behind semi-tractors on public highways. Specifically, the trailer is limited to a height of less than 102 inches and a width of less than 102 inches. In one preferred embodiment, the trailer has a length of approximately 34 feet.

Figure 3:
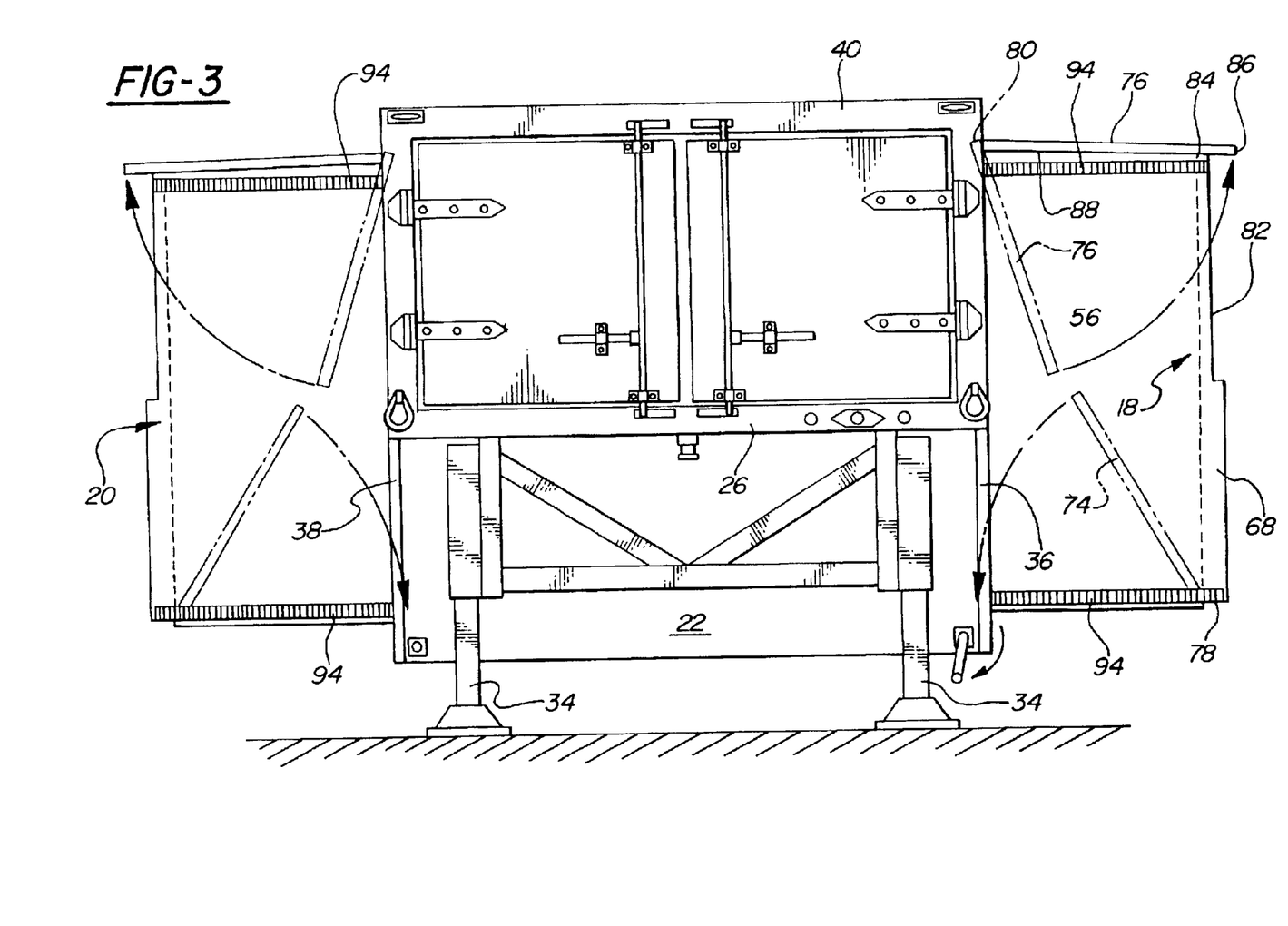
FIG. 3 is a front elevational view of an expandable trailer according to the present invention with each of the expansion modules in their expanded positions.
Figure 4:
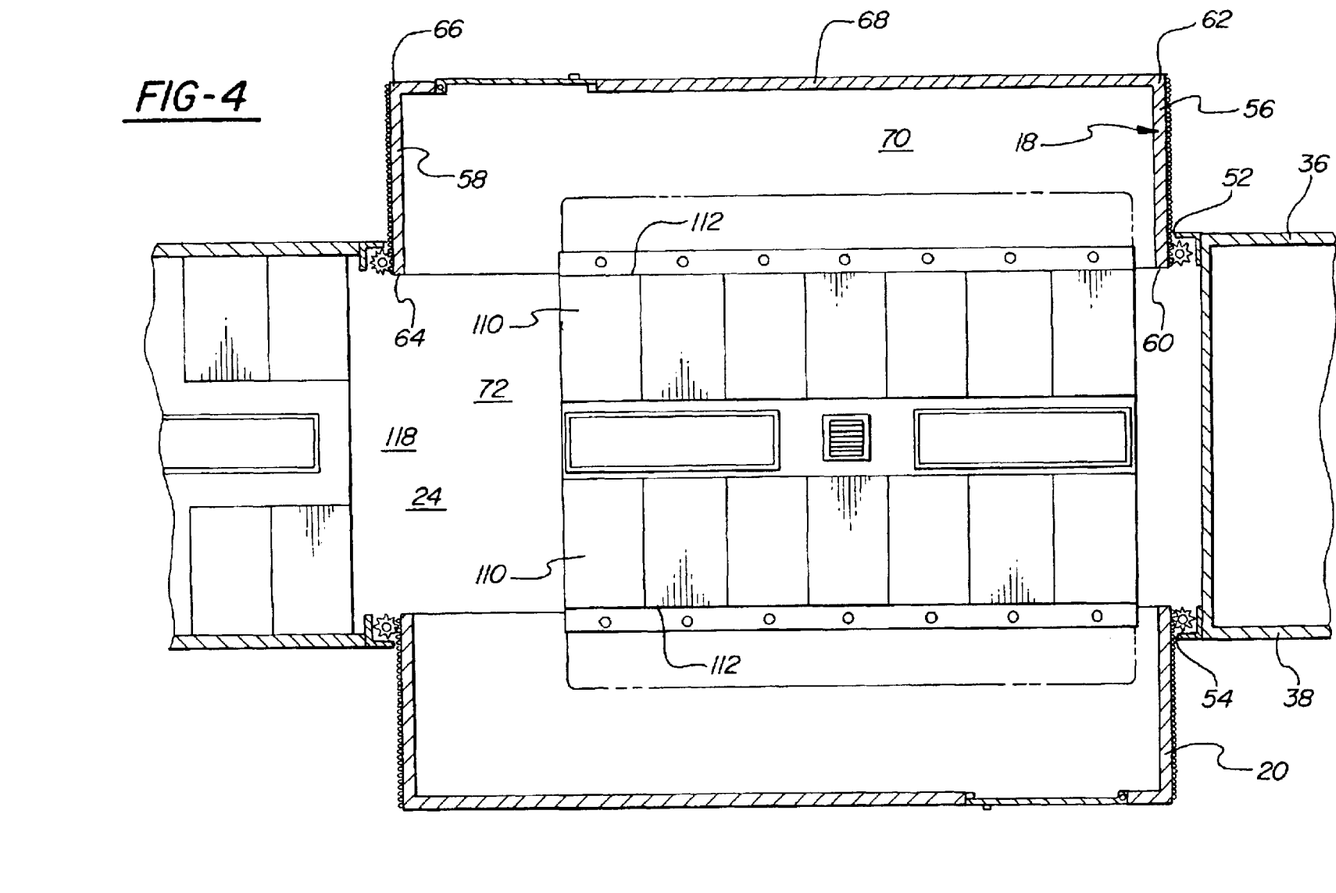
FIG. 4 is a top plan view of a mid portion of a trailer according to the present invention with the roof removed to show the internal configuration.

Referring now to FIGS. 3 and 4, it can be seen that the preferred embodiment of the trailer 10 includes two expansion modules 18 and 20. The construction of the trailer may best be described with reference to FIGS. 3, 4, and 8. The trailer includes a support frame 22 which defines the lower portion of the trailer 10 and has an upper surface which defines the floor 24 of the central portion of the trailer 10. The front 26 of the support frame 22 is configured to interconnect the trailer 10 with a tow vehicle. The rear 28 of the support frame 22 includes an attachment 30 for interconnecting the sub-trailer 14 with the trailer 10. Ground-engaging wheels 32 are disposed on the underside of the support frame 22 and allow transport of the trailer 10. Stabilizing support jacks 34 are provided at or near the four corners of the support frame 22. As known to those of skill in the art, the support jacks 34 retract into the support frame 22 when the trailer is being transported. When the trailer 10 is stationary, the jacks 34 extended downwardly from the support frame so as to engage the ground and stabilize and support the trailer 10. This prevents movement of the trailer on its suspension as loading in and on the trailer changes.

Figure 8:
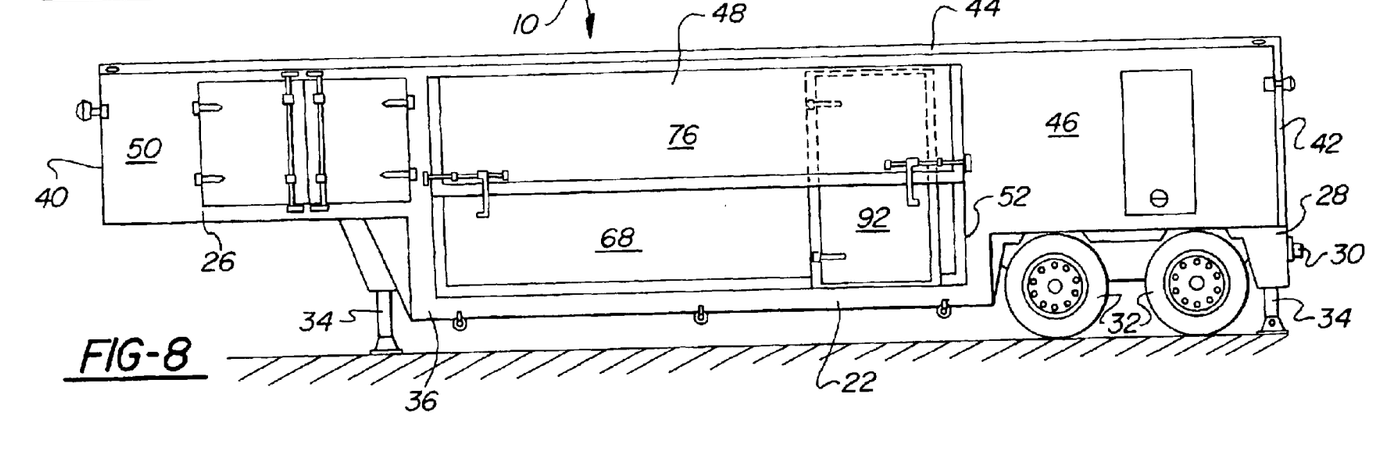
FIG. 8 is a side elevational view of an expandable trailer according to the present invention.

A pair of generally vertical side walls 36 and 38 extend upwardly from the support frame 22. The side walls 36 and 38 are spaced apart and define a transport area therebetween. A front wall 40 closes off the front of the trailer 10 and a rear wall 42 closes off the rear of the trailer. A roof 44 closes off the top of the trailer 10. As best shown in FIG. 8, the trailer 10 is a double-drop design, which means that a portion of the trailer forward of the wheels 32 and behind the hitch area has a lowered floor area so as to give increased interior space. The sections of the trailer may be generally defined as a rear portion 46 located above the rear wheels, a mid portion 48 forward of the rear wheels 32, and a front portion 50 which comprises the raised portion of the trailer that resides above the rear axles of the tow vehicle when the trailer is interconnected for towing. Those of skill in the art may also know the front portion as the attic portion of the trailer 10. The mid portion 48 of the trailer 10 is apportioned primarily to be used by operators when operating the satellite communication equipment transported by the vehicle. The rear portion 46 and front portion 50 are dedicated to support equipment, such as air conditioning equipment, generators, electrical supplies and other equipment. This support equipment is located in the front and rear portions of the trailer where the overall height of the trailer is reduced. This leads the mid portion, where the height is increased, for use by operators.

Openings 52 and 54 are defined in the sides 36 and 38 of the trailer. These openings take up substantially the entire sides of the trailer in the mid portion 48 region. Expansion modules 18 and 20 are supported in these openings 52 and 54 and are movable between a closed position, as shown in FIGS. 1 and 8, and an expanded position as shown in FIGS. 2, 3 and 4. The expansion modules are kept in a closed position when the vehicle is transported, thereby providing the vehicle with a smaller cross-section. However, once the trailer is set up on location, the expansion modules may be moved to their expanded positions to provide additional space inside of the trailer.

Referring now to FIG. 4, the construction of the expansion module 18 will be described, it being understood that expansion module 20 is a mirror image thereof. The module 18 includes a front panel 56 and a rear panel 58 which are spaced apart generally vertical panels that are disposed generally perpendicular to the side wall 36 of the trailer 10. Front panel 56 has a generally vertical inboard edge 60 and a generally vertical outboard edge 62. Likewise, the rear panel 58 has an inboard edge 64 and an outboard edge 66.

The expansion module 18 also includes a generally vertical side panel 68 which extends between the outboard edges 62 and 66 of the front panel 66 and rear panel 58. As shown, the side panel 68 is generally perpendicular to the front and rear panels and is generally parallel to the side wall 36. In FIG. 4, the expansion module 18 is shown in its expanded position. In this position, the side panel 68 is spaced from the side wall 36 and the inboard edges 60 and 64 of the front and rear panels 56 and 58 are adjacent to side wall 36. This defines a work space 70 between the side panels 68 and any equipment mounted to the floor 24 of the central portion of the trailer. "Central portion" refers to the fixed portion of the trailer between the expansion modules 18 and 20. This is generally indicated as 72.

In the preferred embodiment of the present invention, the front panel 56, rear panel 58 and side panel 68 are rigidedly interconnected so that their illustrated configuration remains constant. However, no fixed roof or floor panel is provided as part of the expansion module 18. Instead, as best shown in FIG. 3, a movable floor panel 74 and movable roof panel 76 are used. The floor panel 74 is movable between a generally vertical position where it is aligned with the side panel 18 in a generally horizontal position. In FIG. 3, the floor panel 74 is shown part way through its movement between positions. With the expansion module 18 in the expanded position, as shown in FIG. 3 and on the left side of FIG. 9, the floor panel 74 is placed in its horizontal, or use position wherein it extends between the lower edge 78 of the side panel 68 and the floor of the central portion of the trailer. In this way, the floor panel 74 provides a floor extending into the workspace 70 in the expansion module 18 when the expansion module 18 is in its expanded position. When the expansion module 18 is moved to its closed position, the side panel 68 is generally aligned with the side wall 36 of the trailer 10, as shown in FIG. 1. Prior to moving the expansion module 18 to the closed position, the floor panel 74 is moved to its storage position wherein the floor panel 74 is adjacent and parallel to the side panel 68, as shown on the right side of FIG. 9.

As will be clear to those of skill in the art, the floor panel 74 may be interconnected with the remainder of the trailer in a number of ways. For example, one edge of the floor panel 74 may be pivotably interconnected with the lower edge 78 of the side panel 68 so as to allow the motion illustrated in FIG. 3. The opposite edge of the floor panel 74 would then interconnect with the edge of floor in the central portion of the trailer, in any of a number of ways. For example, a portion of the floor panel 74 may overlap the floor in the central portion or the edge of the floor panel 74 may nest in a recess in the edge of the floor in the central portion.

Figure 9:
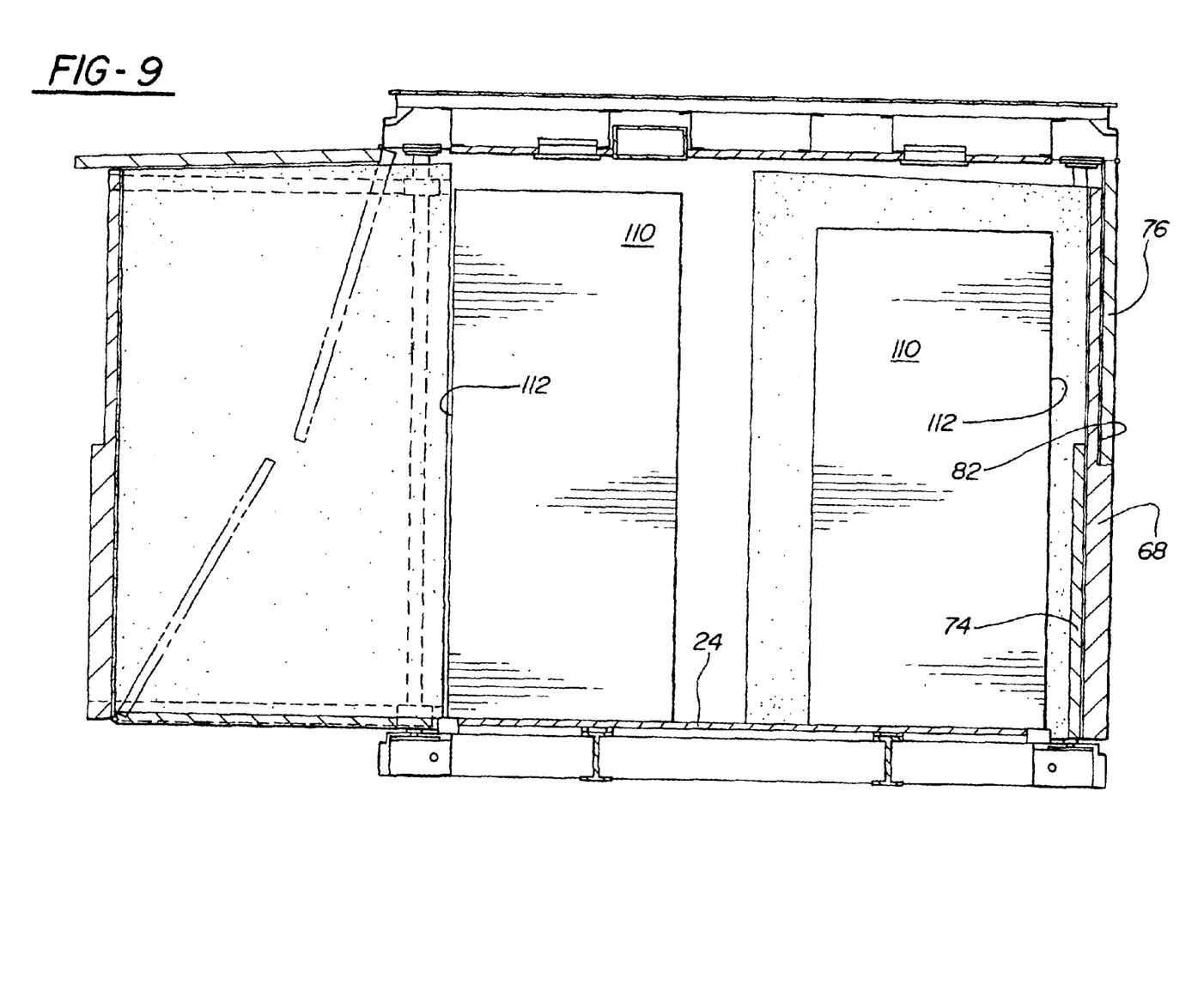
FIG. 9 is a cross-sectional view of the mid portion of a trailer according to the present invention.

The movable roof panel 76 preferably has a first edge 80 which is hingedly interconnected with the side wall 36 of the trailer 10 above the opening 52. As best shown in FIG. 1 and on the right side of FIG. 9, with the expansion module 18 in the closed position, the roof panel 76 extends downwardly and covers a portion of the side panel 68. As shown in FIGS. 3 and 9, the side panel 68 is preferably notched so as to provide a recess 82 in the side panel 68 to accommodate the roof panel 76. In the closed position, the roof 76 defines a portion of the exterior skin of the trailer and helps to protect the upper portion of the side panel 68. When the expansion module moves to the expanded position, as shown in FIG. 3 and on the left side of FIG. 9, the movable roof panel 76 is pivoted to a position wherein it extends outwardly from the side wall 36 of the trailer 10. In this position, the roof panel 76 rests atop an upper edge 84 of the side panel 68, thereby closing off the upper end of the expansion module 18. Preferably, the roof panel 76 has a slight downward slant in this position so as to encourage rain and debris to flow off of the outer edge 86 of the roof panel 76.

The front panel 56 of the expansion module 18 may be seen in FIG. 3. As shown, the upper edge 88 preferably engages with the underside of the roof panel 76 when the expansion module 18 is in its expanded position. For this purpose, the upper edge 88 has a slight downward slant to accommodate the slight downward slant of the roof panel 76. Preferably, the underside of the roof panel 76 is provided with some type of latching or interconnecting device to securely interconnect the roof panel 76 with the side panel 68 in the expanded position. As will be clear to those of skill in the art, this may be accomplished in a number of ways. Also, it is preferred that a seal be provided along the upper edge 84 of the side panel and the upper edges of the front and rear panels so as to seal the roof panel 76 to the expansion module 18. As will be clear to those of skill in the art, as the expansion module 18 is moved back to its closed position, the roof panel 76 will pivot downwardly until it lies adjacent the side panel 68. As shown in FIG. 1, locking members 90 are provided on the outer surface of the roof panel 76 for locking the roof panel against the side of the trailer during transport. As shown in several of the drawings, an access door 92 is provided in the side panel 68. The upper portion on this access door 92 is covered by the roof panel 76 when the trailer is in its transport configuration. The door 92 may be provided towards the front half of the side panel 68 as shown in FIG. 1, or towards the rear of the side panel 68 as shown in FIG. 8.

Figures 5, 5A:
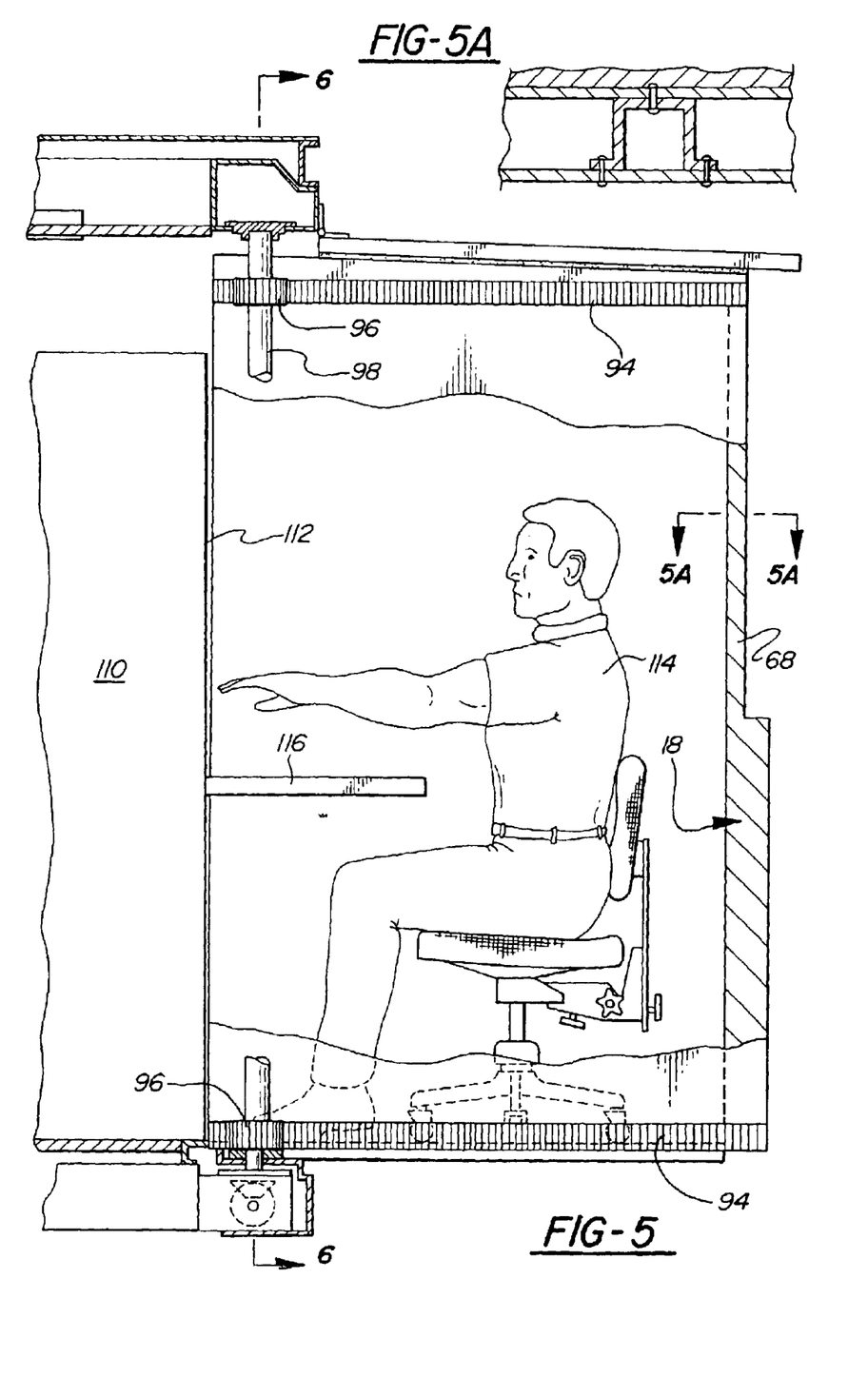
FIG. 5 is a cross-sectional elevational view of an expansion module that forms part of a trailer according to the present invention.
FIG. 5A is a cross-sectional detail view of a portion of a wall of a trailer according to the present invention.
Figure 6:
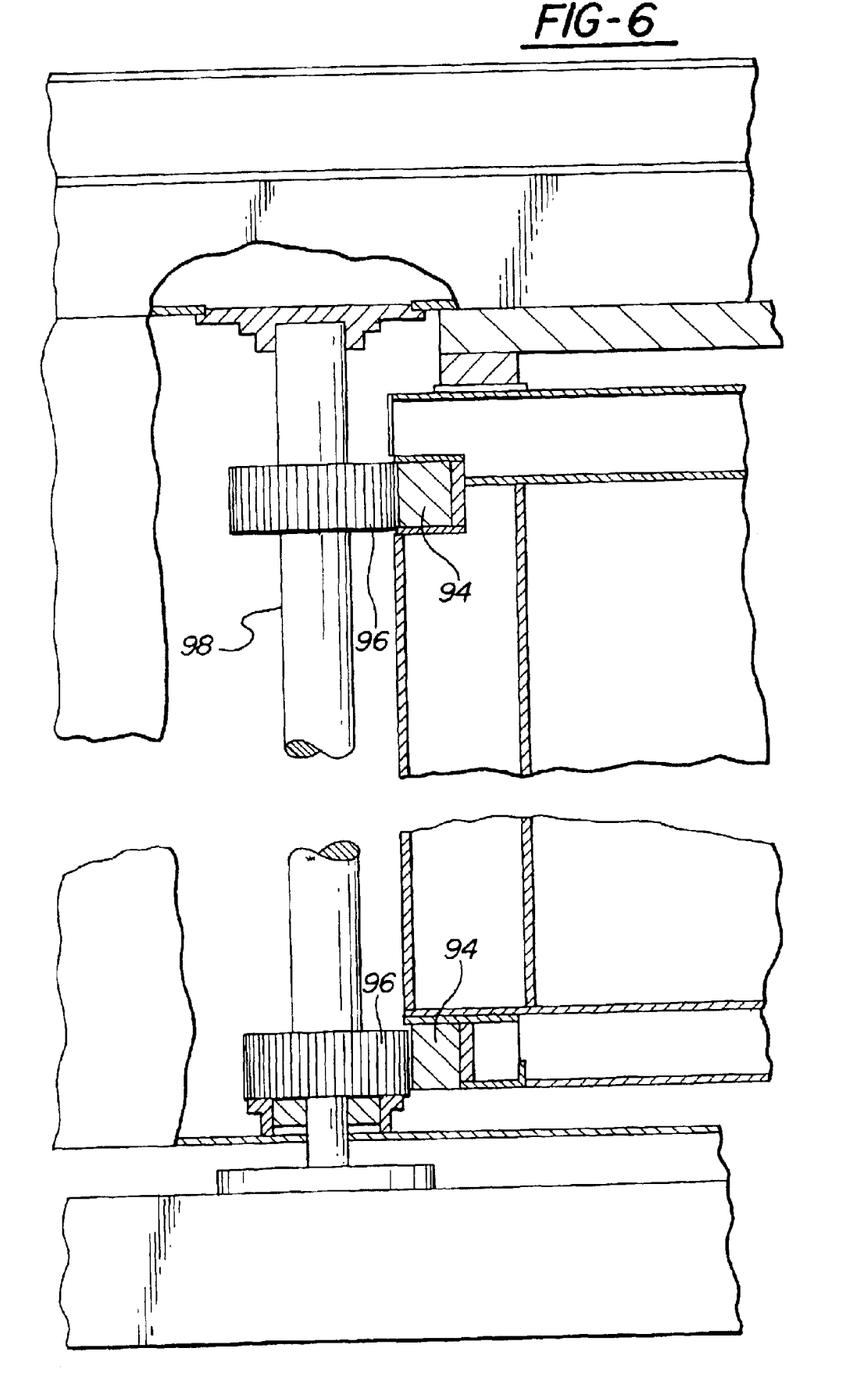
FIG. 6 is a detailed cross-sectional view of the drive mechanism for driving the expansion modules between the expanded and closed positions.

As best shown in FIGS. 3 and 5, the expansion modules 18 and 20 both have gear racks 94 disposed on the front and rear panels. Specifically, each of the front and rear panels has a gear rack 94 running generally horizontal along the outer surface adjacent the upper edge and lower edge. These gear racks comprise a series of gear teeth that extend outwardly from the panels. As shown in FIG. 5, drive gears 96 are supported on a vertical drive shaft 98 and engage the gear racks 94. Therefore, as the drive shaft 94 turns, the drive gears 96 force the gear racks 94 to move inwardly or outwardly, thereby causing the expansion modules to move between the closed and expanded positions. Also shown in FIG. 5, a horizontal drive shaft 100 extends under the floor of the trailer and engages with the vertical drive shafts 98. This horizontal drive shaft 100 engages the vertical drive shafts associated with the front and rear panels on one side of the trailer so that rotation of the horizontal drive shaft 100 causes both vertical drive shafts 98 to turn in unison. Therefore, turning the horizontal drive shaft 100 causes a synchronized movement of all four gear racks 94, maintaining coordinated movement of the expansion module. FIG. 6 shows a cross-sectional view of the engagement between the drive gears 96 and the gear racks 94. As will be clear to those of skill in the art, the horizontal drive shaft 100 may be turned by any of a variety of power drive means or, by a hand crank. In the preferred embodiment, operation is simplified by providing a hand crack which engages with the front end of the horizontal drive shaft to allow a human operator to manually crank the expansion modules in and out.

As best shown in FIGS. 4 and 9, the central portion 72 of the trailer 10 is substantially filled with satellite communication-related electronic components 110. These components 110 are mounted to the floor 24 in the central portion 72 of the trailer and extend upwardly nearly to the interior ceiling. Therefore, if the floor panel 74 were not movable when the expansion modules were moved to the closed position, the floor panel 74 would interfere with the components 110 mounted in the central portion 72. The components 110 have outwardly facing control panels 112 which, when the expansion modules are in the closed positions, are adjacent the side panels of the expansion modules. Therefore, the control panels 112 may not be accessed by a human operator unless the expansion modules are in the expanded positions. As shown, the components 110 are arranged in two banks, each with outwardly facing control panels. Therefore, the backsides of the equipment are directed inwardly towards each other. Some space may be left in between the bank of components for routing of wire and duct work for cooling the equipment. However, for maintenance purposes, one of the banks is preferably mounted on wheels so that the bank may be rolled outwardly into one of the expansion modules to allow access to the rear of the bank's components for maintenance purposes. The movable bank may then be locked down once it is returned to its use position in the central portion 72 of the trailer.

As shown in FIG. 5, once the expansion module 18 is extended outwardly, work space 70 is provided for a human operator 114. Preferably, a removable work surface 116 is provided for use by the operator 114. This work surface 116 is attachable to the components 110 so that it extends perpendicularly into the work space 70. However, this work surface 116 would interfere with closure of the expansion module 18 if it remains stationary. For this purpose, the work surface 116 is removable from the components and may then be hung on brackets on the inside surface of the outer side panel 68. These brackets, not shown, are preferably removable once the work space 116 is installed so that the brackets do not interfere with the work space or injure the operator 114.

As best shown in FIG. 4, the work spaces and expansion modules are interconnected by an aisle 118 that passes through the central portion of the trailer. This area is left empty so as to allow movement of an operator from one work space to the other so that all equipment may be reached without exiting the trailer.

As will be clear to those of skill in the art, a trailer according to the present invention may be constructed using a variety of materials and techniques. In one preferred embodiment of the present invention, the walls have a construction as shown in FIG. 5A. The walls are constructed with a flat sheet of aluminum defining both the exterior and interior skins of the walls. Interconnecting the two skins of the wall are metal "top hat" channels. The space between the skins of the wall is filled with foam for structural and thermal performance. Preferably, the interior skin of the wall is covered with a carpet or carpet-like material.

I claim:

1. A transportable satellite communication station comprising:

an expandable trailer having a central portion comprising a support frame defining a floor and a pair of spaced apart upwardly extending side walls defining an interior transport area therebetween, each of said side walls having an opening defined therein;

an expansion module supported in each of said openings for movement between a closed position and an expanded position, each expansion module comprising a front panel and a rear panel and a side panel extending between said front and rear panels, each of said side panels being generally aligned with one of said side walls when said expansion modules are in said closed position and being outwardly spaced from said side walls when said expansion modules are in said expanded position;

satellite communication related electronic components being supported on said floor and filling substantially all of the space between said side walls, said electronic components having outwardly facing control panels which are adjacent said side panels when said expansion modules are in said closed position, said control panels being accessible by a human operator only when said expansion modules are in said expanded position wherein said side panels are spaced from said control panels so as to define a working space.

2. The expandable trailer according to claim 1, further comprising a removable work surface detachably connected to electronic equipment.

3. The expandable trailer according to claim 1, wherein an open aisle is defined through said interior transport area interconnecting said expansion modules.

* * * * *